(12) United States Patent
Bessette

(10) Patent No.: US 7,497,530 B2
(45) Date of Patent: Mar. 3, 2009

(54) TRACTION ASSEMBLY FOR A VEHICLE

(75) Inventor: Robert Bessette, Mont St-Grégoire (CA)

(73) Assignee: Soucy International Inc., Drummondville, Québec (CA)

( * ) Notice: Subject to any disclaimer, the term of this patent is extended or adjusted under 35 U.S.C. 154(b) by 134 days.

(21) Appl. No.: 11/338,713

(22) Filed: Jan. 25, 2006

(65) Prior Publication Data

US 2006/0181148 A1  Aug. 17, 2006

(30) Foreign Application Priority Data

Jan. 28, 2005  (CA) .................... 2495642
Jan. 20, 2006  (CA) .................... 2533517

(51) Int. Cl.
*B62D 55/14*  (2006.01)

(52) U.S. Cl. .................. 305/135; 305/128; 305/131

(58) Field of Classification Search ............... 305/120, 305/121, 124, 127, 128, 129, 130, 131, 134, 305/135, 15; 180/9.26, 9.5, 9.54
See application file for complete search history.

(56) References Cited

U.S. PATENT DOCUMENTS

| | | | | |
|---|---|---|---|---|
| 1,304,428 A | * | 5/1919 | White ..................... 305/129 |
| 2,467,947 A | * | 4/1949 | Skelton ..................... 180/9.5 |
| 3,774,708 A | * | 11/1973 | Purcell et al. ............... 180/9.5 |
| 3,841,424 A | * | 10/1974 | Purcell et al. ............... 180/9.5 |
| 5,273,126 A | * | 12/1993 | Reed et al. ................. 180/9.21 |
| 5,607,210 A | | 3/1997 | Brazier |
| 6,006,847 A | | 12/1999 | Knight |
| 6,095,275 A | | 8/2000 | Shaw |
| 6,199,646 B1 | * | 3/2001 | Tani et al. ................... 180/9.21 |
| 6,401,847 B1 | * | 6/2002 | Lykken ...................... 180/9.1 |
| 6,810,975 B2 | * | 11/2004 | Nagorcka et al. ........... 180/9.5 |
| 6,869,153 B2 | * | 3/2005 | Wright et al. ............... 305/169 |
| 6,874,586 B2 | | 4/2005 | Boivin et al. |
| 7,196,862 B1 | * | 3/2007 | Adams et al. ................ 360/51 |
| 7,222,924 B2 | * | 5/2007 | Christianson ............... 305/135 |
| 7,357,201 B2 | * | 4/2008 | Jordan ........................ 180/9.26 |

* cited by examiner

*Primary Examiner*—Jason R Bellinger
*Assistant Examiner*—Kip T Kotter
(74) *Attorney, Agent, or Firm*—Brouillette & Associates/Partners

(57) ABSTRACT

This invention relates to a traction assembly for a vehicle which uses an endless traction band and a plurality of wheels for propulsion. The traction assembly pivots around a pivot point located under the traction axle of the vehicle. This pivot point is preferably longitudinally displaced in relation to such axle.

12 Claims, 17 Drawing Sheets

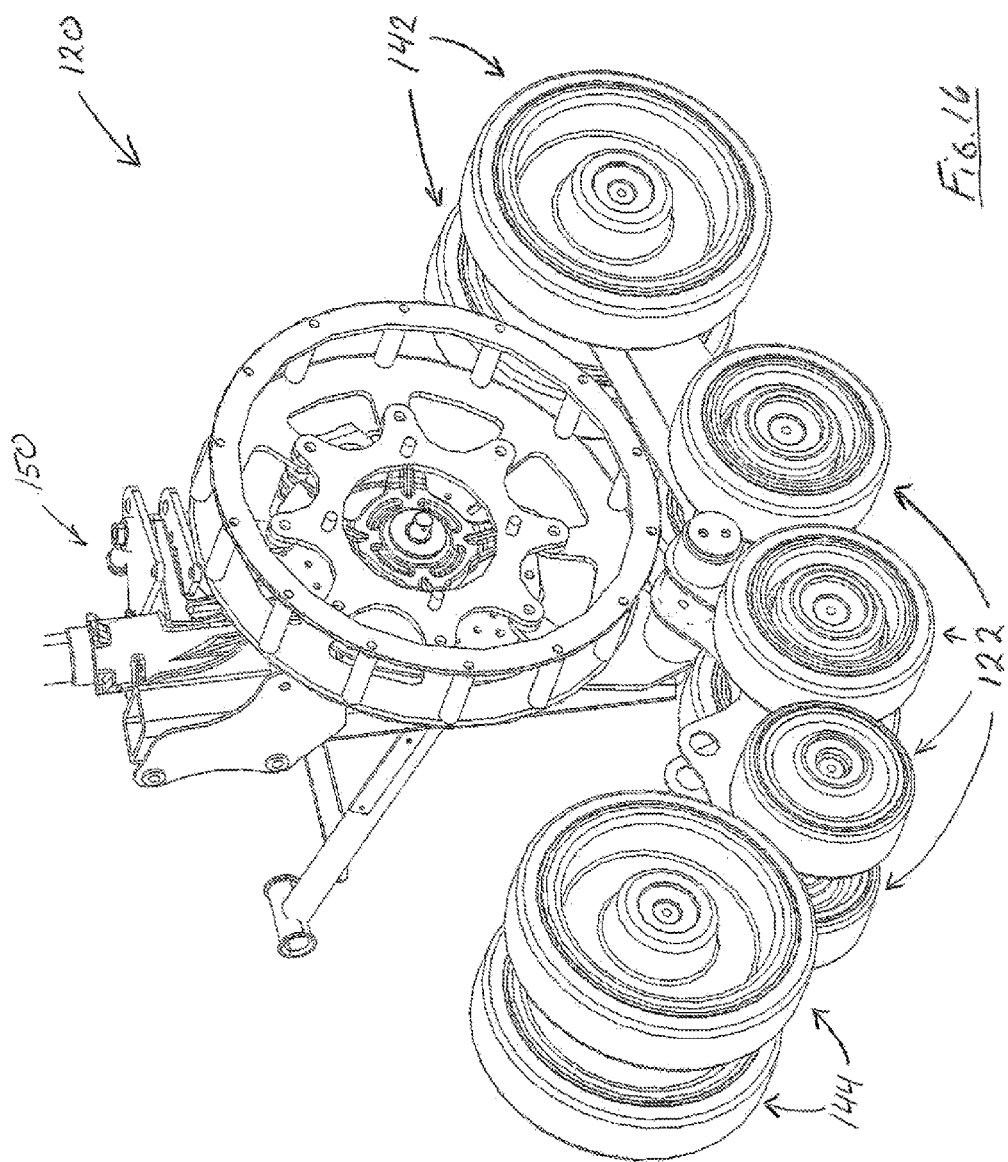

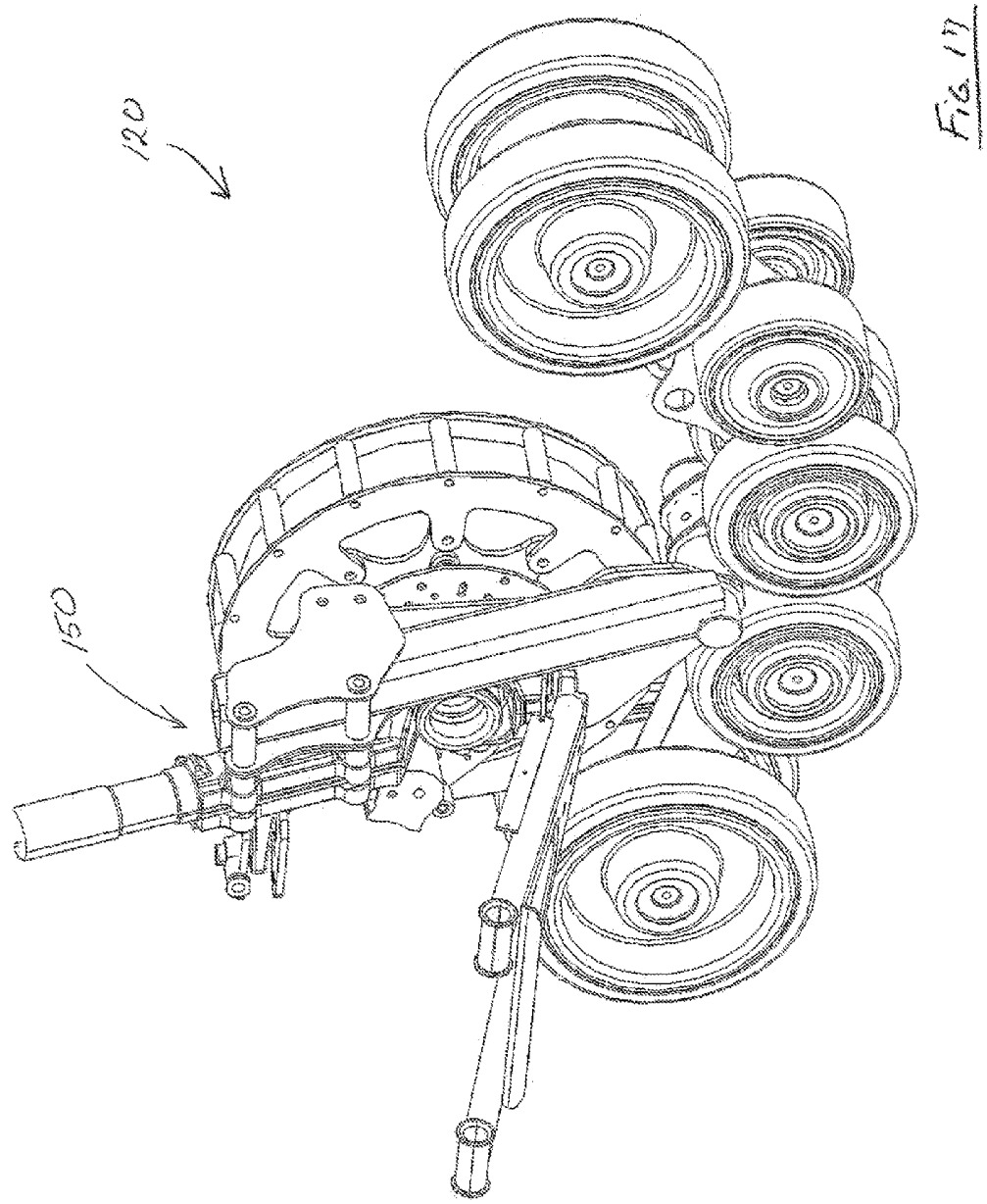

TRACTION ASSEMBLY FOR A VEHICLE

FIELD OF THE INVENTION

This invention relates to a traction assembly for a vehicle. More particularly, the present invention relates to traction assemblies with lower and longitudinally displaced pivoting points.

BACKGROUND OF THE INVENTION

The type of surfaces over which a vehicle is ridden significantly affects its capacity and efficiency.

While the riding behavior is one of the most important aspects involved in the concept of a vehicle, the ability to allow interchangeability of parts or to retrofit new components on existing vehicles greatly satisfies the owner of vehicles and represents an interesting market source for vendors of specialized parts destined to vehicles such as snowmobiles, motorcycles, all terrain vehicles (ATVs), tractors, trucks, etc.

Specialized parts for those vehicles include kits which may develop the vehicle's capacity to accomplish other functions, to extend its duration of use throughout the seasons or to allow the use of the vehicle under different riding conditions.

For instance, different riding kits are sometimes installed to replace the wheels of existing vehicles. In principle, the kits should minimize the need to change existing components, must be able to fit on the vehicle without interference and should try to minimize any negative change to the overall riding behavior of the vehicle and comfort of the driver.

However, since most vehicles are initially designed for a typical use on a specific ground surface, some vehicle parameters like steering, weight distribution or general stability may be affected by different vehicle uses combined with other components such as different riding kits. For example, a better riding behavior on snow usually requires less weight applied to ski assemblies (usually located at the forward portion of the vehicle) than for a regular vehicle riding on another ground surface.

Numerous traction kits have been proposed throughout the years. In "Wheel Mount Track Conversion Assembly" (U.S. Pat. No. 5,607,210 issued on Mar. 4, 1997), Brazier proposes a traction kits to replace the wheels of wheeled vehicles. His system further comprises an anti-torque system that prevents the kit from contacting the vehicle. Though it can be easily mounted on a wheeled vehicle, the system of Brazier does not include particular means to allow a better weight distribution or a better maneuverability of the kit equipped vehicle. Moreover, the traction kit of Brazier can only pivot around the axle axis.

In "Conversion System for All Terrain Vehicles" (U.S. Pat. No. 6,095,275 issued on Aug. 1, 2000), Shaw proposes an ATV equipped with conversion kits such as ski assemblies and traction assemblies to replace existing wheels. Although adapting to the existing power system, the conversion system does not provide adjustability means for the weight distribution of the vehicle, such that the ATV's weight is dispersed to the ground surface through the traction and ski assemblies. Also, as for Brazier, the traction kit of Shaw can only pivot around the axis of the axle.

The problem with these particular arrangements is that in order to follow the bumps and depressions of the terrain over which the vehicle is ridden, the traction kit needs to pivot around the axis of the axle, which implies unnecessary large movements of the traction kit. These large movements are translated into an uncomfortable ride for the user. Furthermore, these traction kits generally need means to prevent any contact between the traction assembly and the body of the vehicle. These means generally add to the weight and cost of the assembly.

There is therefore a need for a traction assembly which improves riding condition when traction assemblies are used to replace existing wheels on vehicles.

OBJECTS OF THE INVENTION

Accordingly, an object of the present invention is to provide a traction assembly for a vehicle which uses an endless traction band.

Another object of the present invention is to provide a traction assembly which is compact and easily retrofitted on a vehicle.

Another object of the present invention is to provide a traction assembly which can be easily installed either in the front or in the back of a vehicle or both.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

To attain these and other objects which will become more apparent as the description proceeds according to one aspect of the present invention, there is provided a traction assembly.

The object of the present invention involves a traction assembly that can preferably replace a wheel on vehicle. The traction assembly thus involves a vehicle with a frame and at least one traction axle. Preferably, the traction assembly can replace wheels on either side of the front portion and/or the rear portion of the vehicle.

More particularly, the traction assembly includes a sprocket wheel and a longitudinally extending traction band cooperating with such sprocket wheel. The sprocket wheel is preferably fixedly attached by means known in the art to the traction axle (or the wheel hub) of the vehicle. The traction assembly also comprises a support structure, sometimes in the form of a slider bar, on which at least one but preferably two idler wheels are pivotally mounted. These idlers wheels are preferably mounted at the extremities of the support structure. A plurality of road wheels can also be pivotally mounted on either side the support structure to increase the stability of the traction band.

In a first embodiment, the support structure (or slider bar) is connected to the vehicle via a member which is non-drivingly mounted on the sprocket wheel (or an extension thereof). More precisely, the first end of the member is non-drivingly attached to the sprocket wheel or to a laterally extending structure axially extending from the sprocket wheel axle. This first end is preferably attached to the sprocket wheel or to the laterally extending support with rollers or ball-bearings. The second end is attached to a pivot point located under the traction axle, on the support structure (or slider bar) and preferably longitudinally displaced in relation to such traction axle. The member is preferably rigid and can be adjustable.

To increase the adjustability of the pivot point, protuberances extending toward or in vicinity of the sprocket wheel can be provided on the support structure These protuberances include at least one and preferably a plurality of pivot points to which the member can be pivotally attached.

In another embodiment of the present invention, the support structure (or slider bar) is connected to the vehicle via a member which is fixedly mounted onto the suspension leg connected to the traction axle. As for the first embodiment, the second end of the member is pivotally connected to the support structure via a first pivot means located on the support structure. This first pivot means is also located under the axis of the sprocket wheel and axle. In this embodiment, there is no need for another link connecting the member to the vehicle frame. Nevertheless, a shock absorber can preferably be pivotally connected between the member and the support structure (or slider bar). This shock absorber improves the riding quality of the vehicle.

Other aspects and many of the attendant advantages will be more readily appreciated as the same becomes better understood by reference to the following detailed description and considered in connection with the accompanying drawings in which like reference symbols designated like elements throughout the figures.

The features of the present invention which are believed to be novel are set forth with particularity in the appended claims.

BRIEF DESCRIPTION OF THE FIGURES

FIG. 16 is an exterior perspective view of the traction assembly of FIG. 14.

FIG. 17 is an interior perspective view of the traction assembly of FIG. 14.

The present invention relates to a traction assembly for a vehicle using an endless traction band and a plurality of wheels for propulsion on irregular terrains.

The following description will be made according to embodiments of the present invention designed to be installed on ATVs and other similar vehicles. However, it is to be understood by the skilled addressee that the present invention can be adapted for any wheeled vehicles. Therefore, variants of the present invention adapted to be used on trucks, tractors and other similar vehicles fall inside the scope of the present invention.

Figure 1:
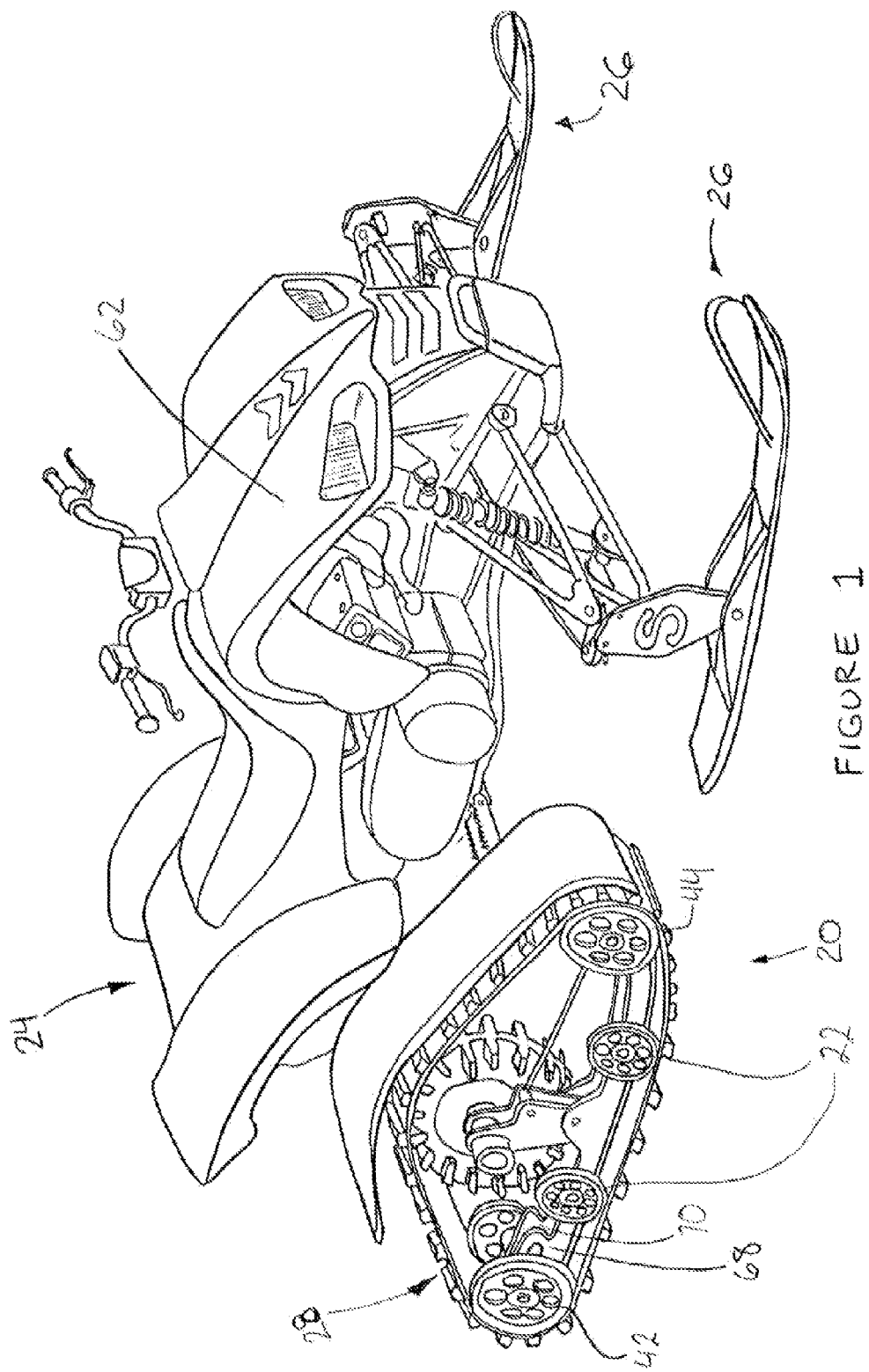
FIG. 1 is an isometric view showing a vehicle including traction assemblies according to one preferred embodiment of the invention.
Figure 5:
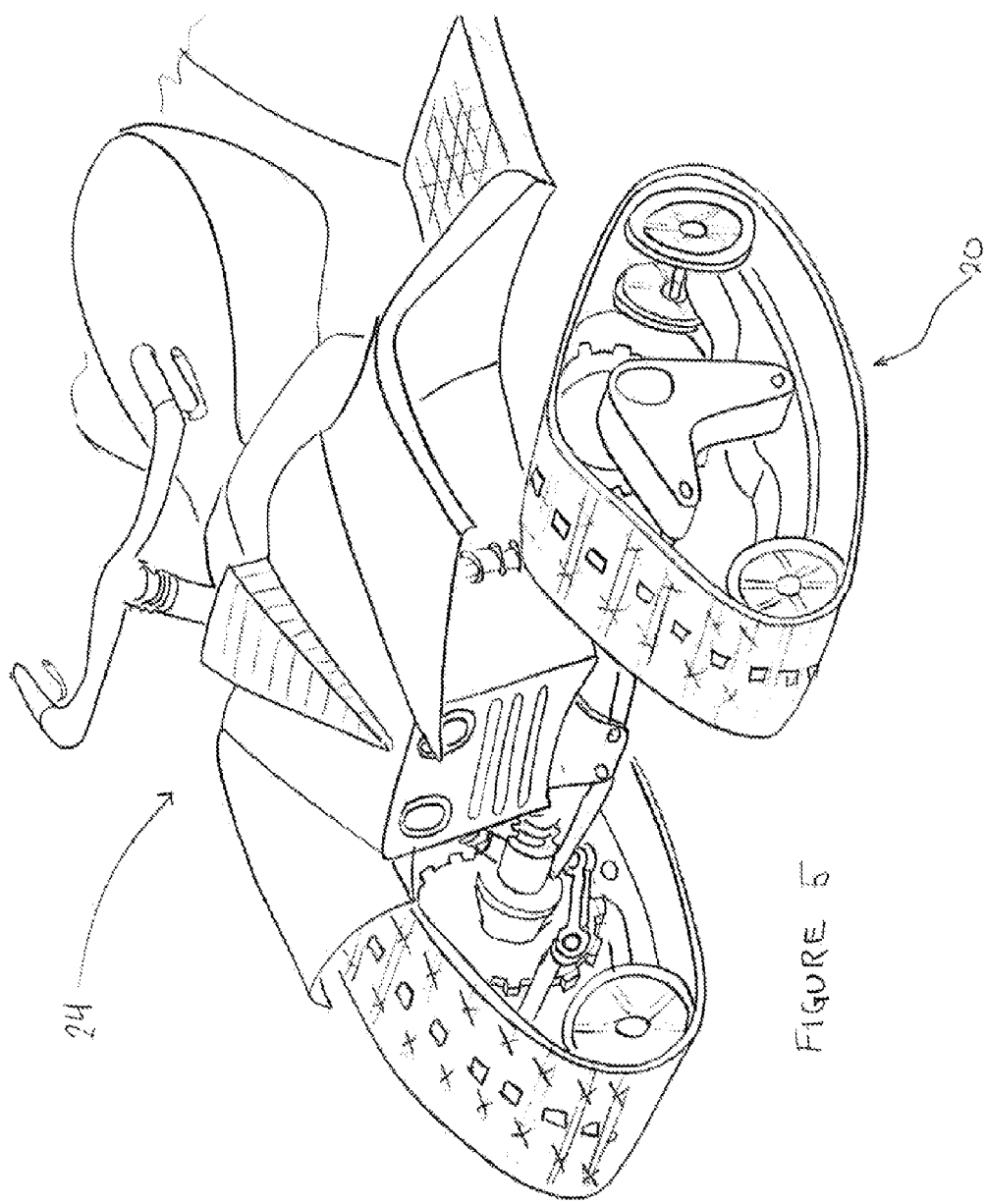
FIG. 5 is a partial isometric view showing a vehicle including front and rear traction assemblies according to another preferred embodiment of the invention.
Figure 6:
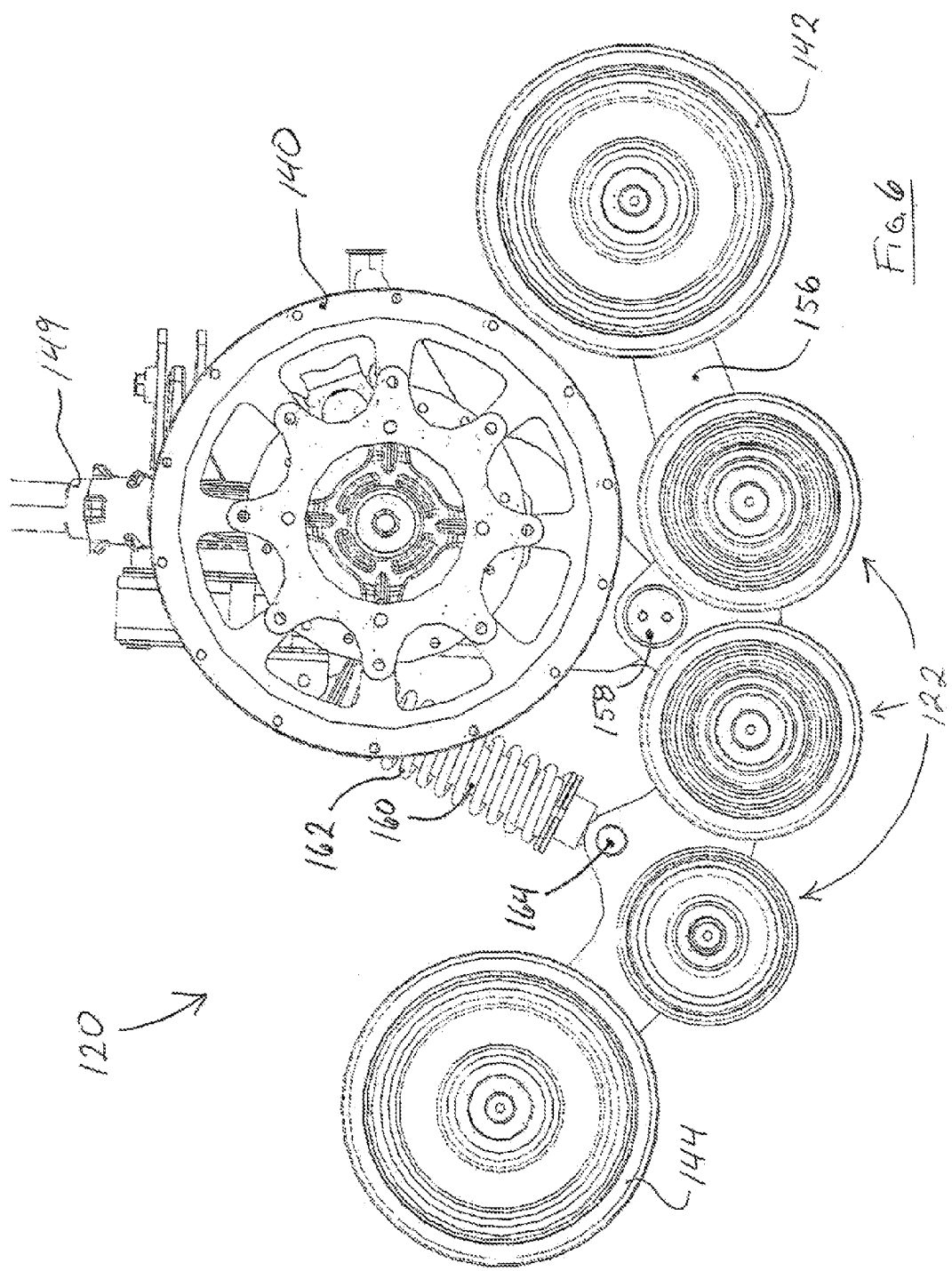
FIG. 6 is an exterior side view of another preferred embodiment of the traction assembly of the present invention.
Figure 7:
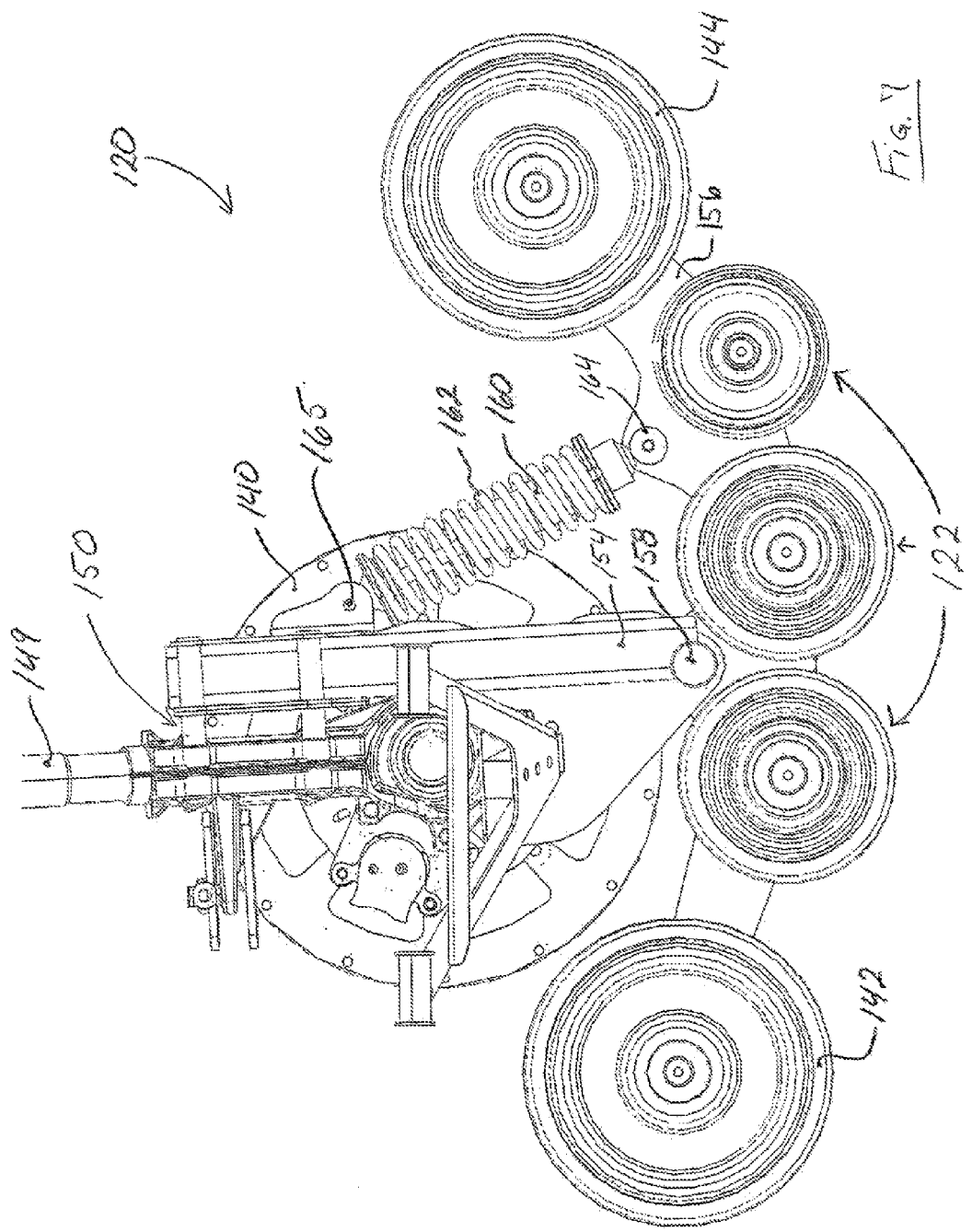
FIG. 7 is an interior side view of the traction assembly of FIG. 6.
Figure 8:
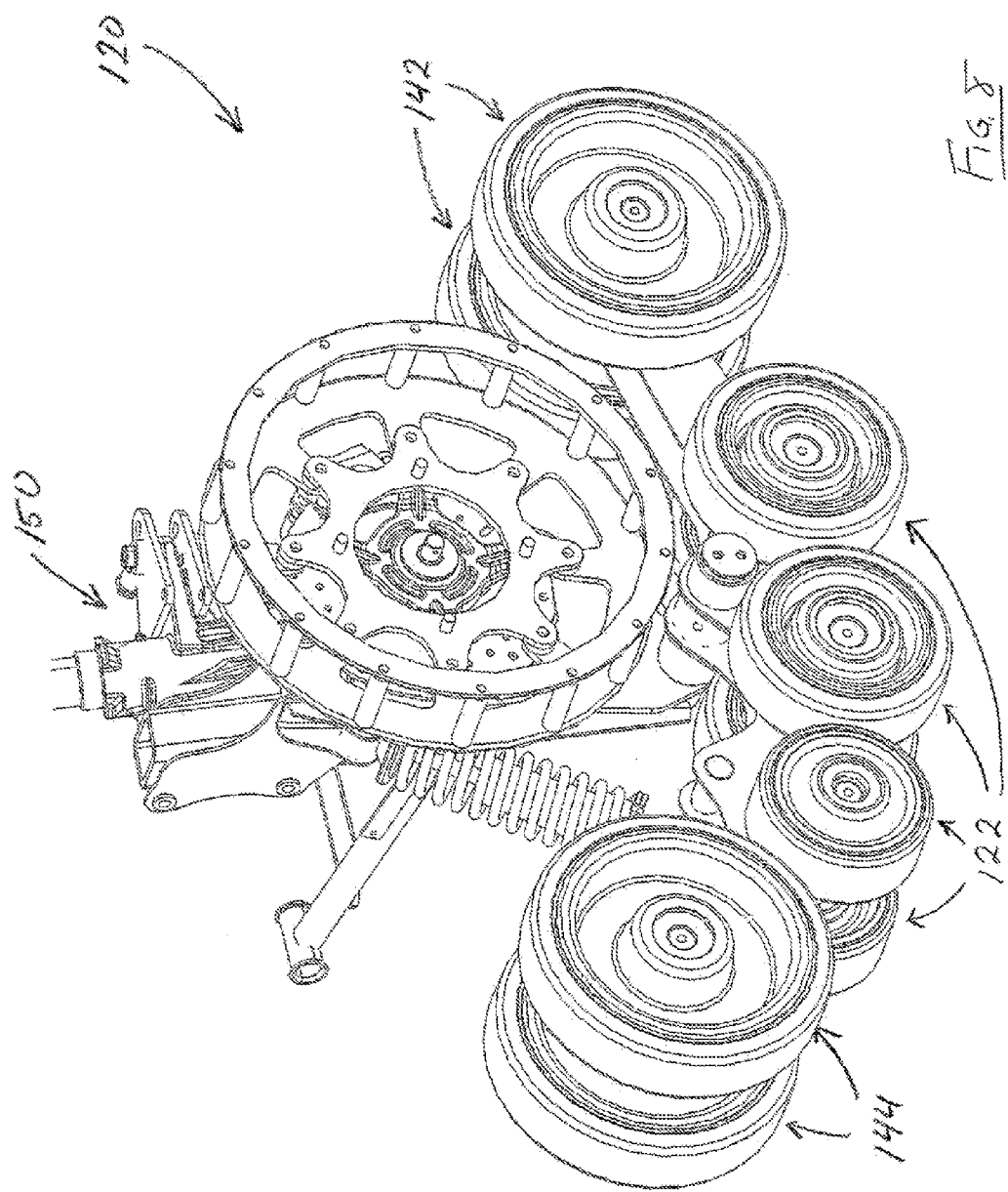
FIG. 8 is an exterior perspective view of the traction assembly of FIG. 6.
Figure 9:
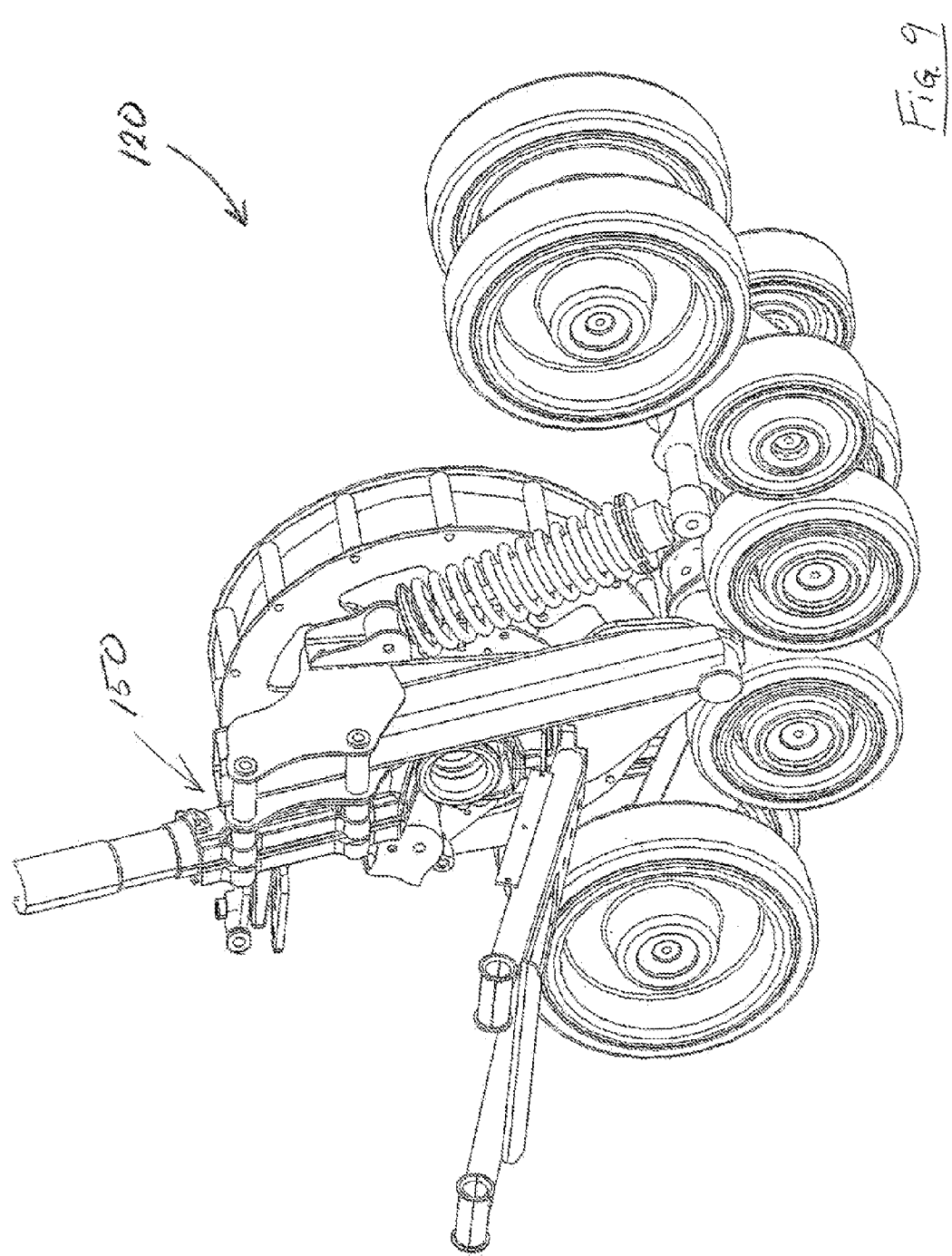
FIG. 9 is an interior perspective view of the traction assembly of FIG. 6.
Figure 10:
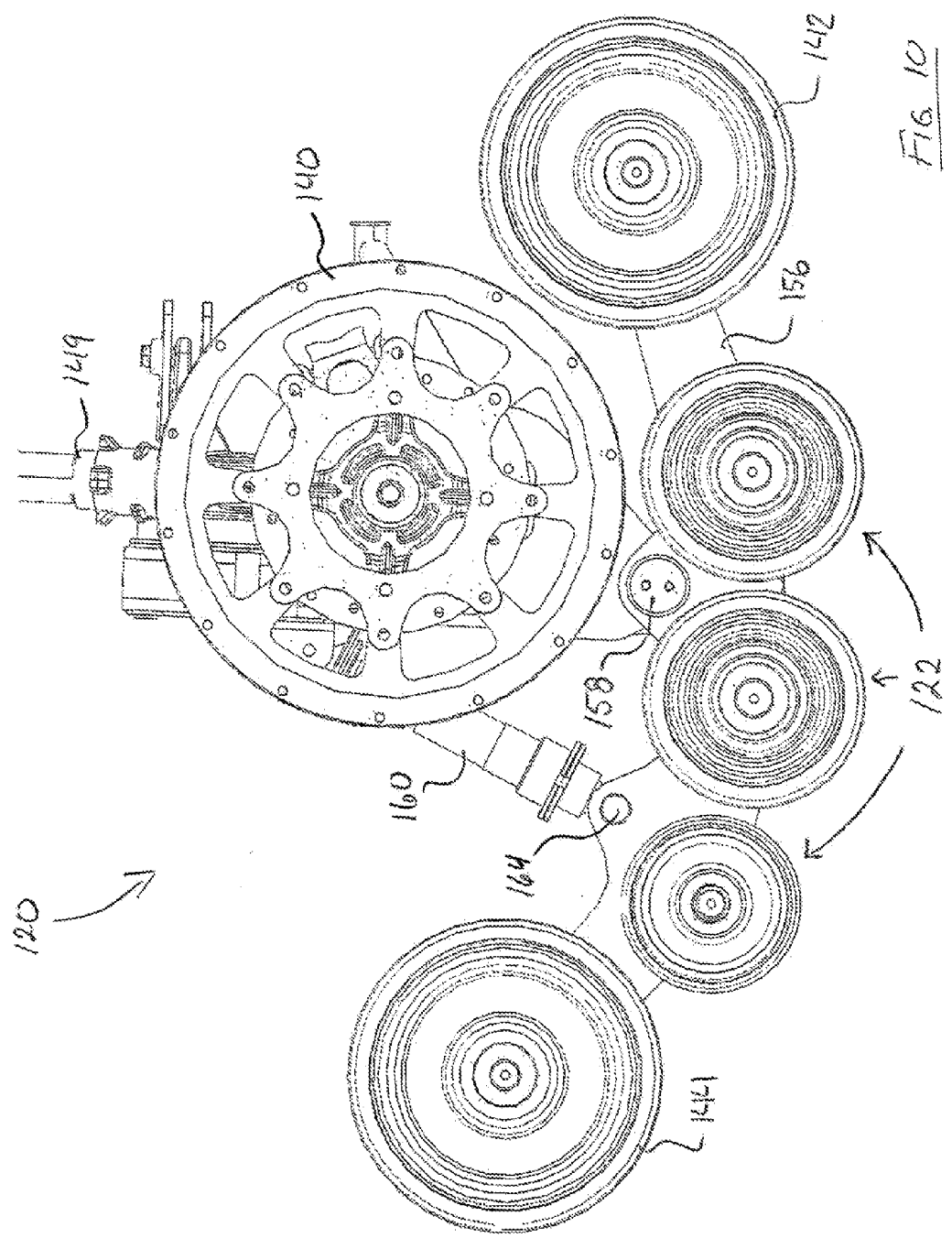
FIG. 10 is an exterior side view of a variant of the embodiment of FIG. 6 without the spring.
Figure 11:
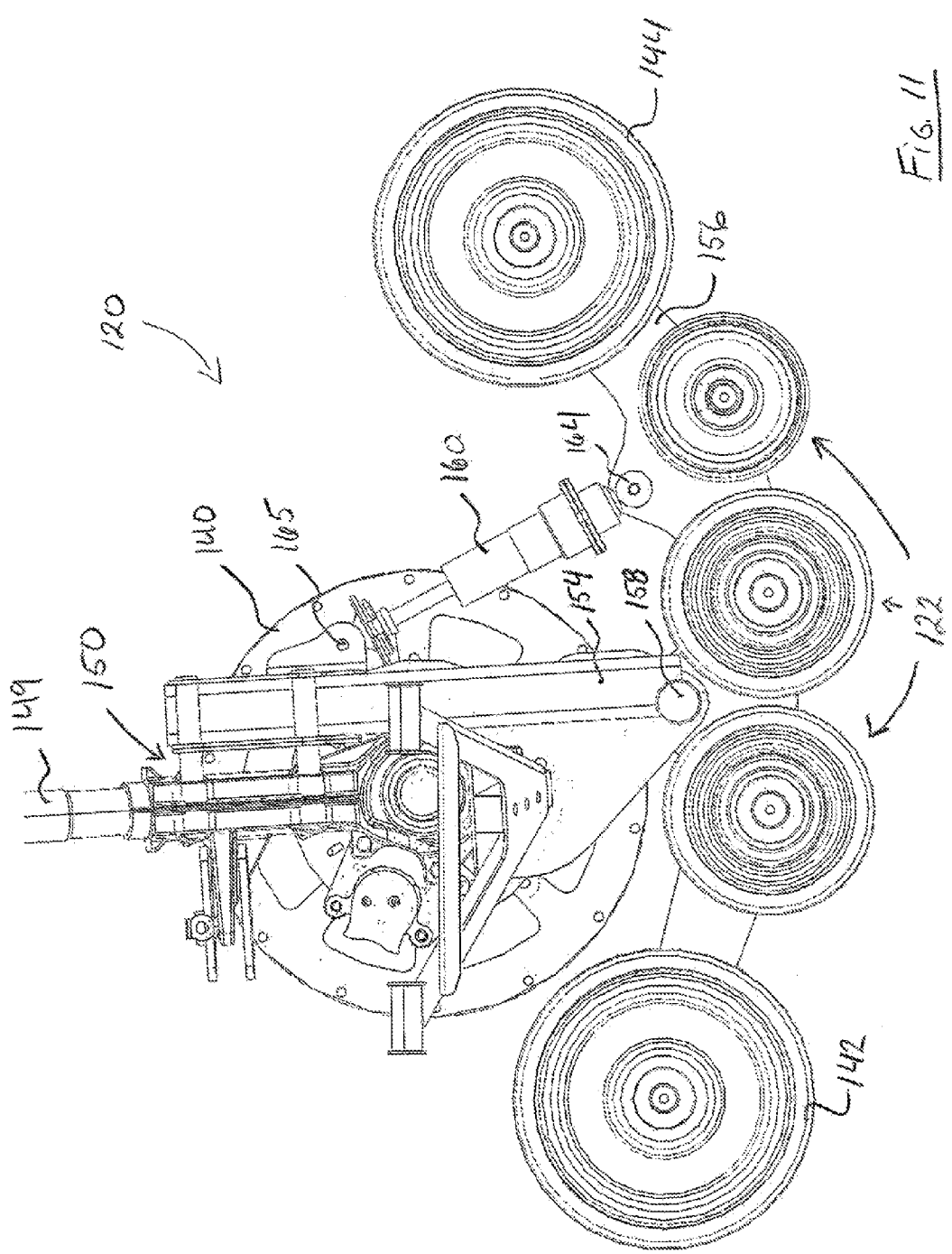
FIG. 11 is an interior side view of the traction assembly of FIG. 10.
Figure 12:
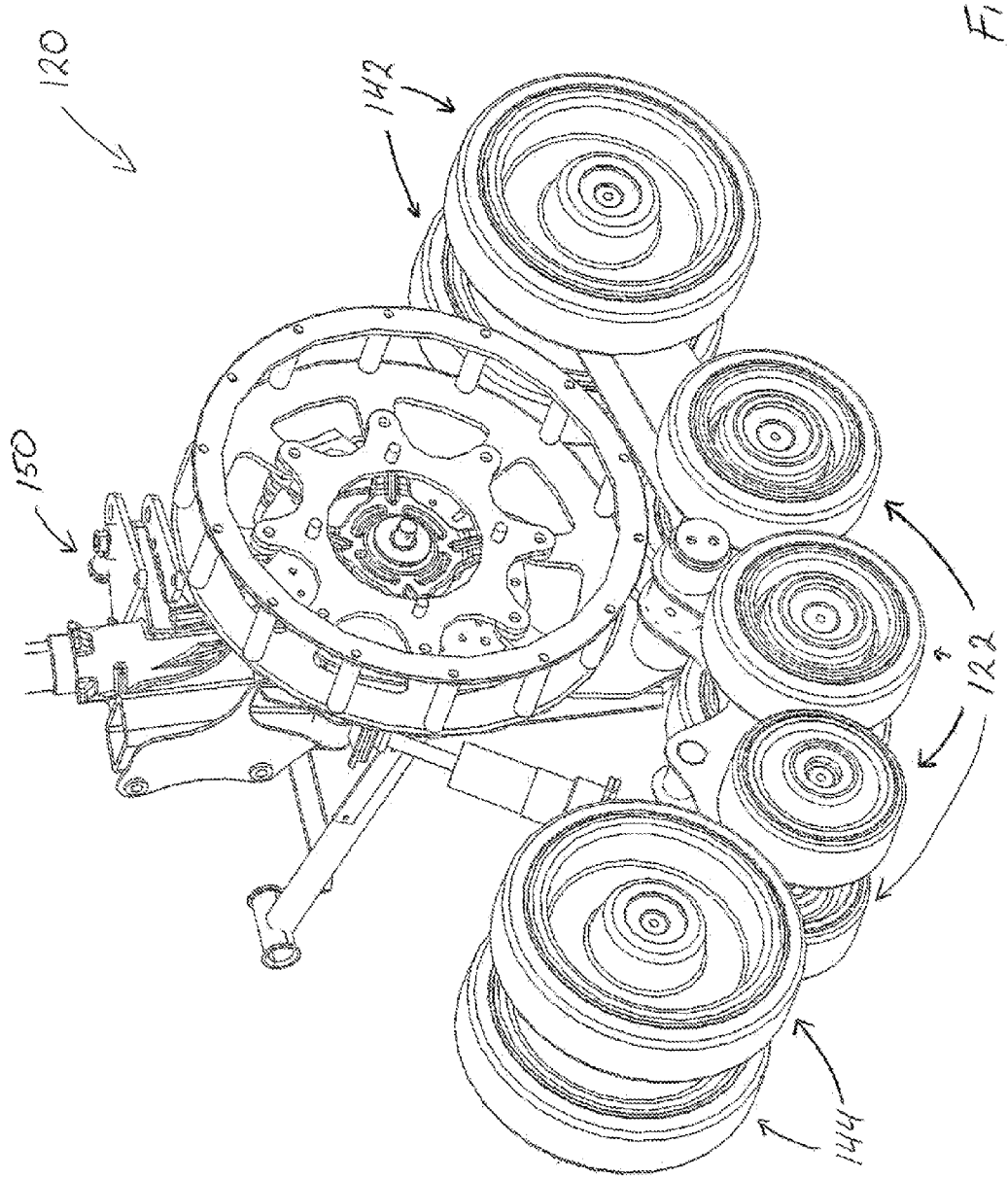
FIG. 12 is an exterior perspective view of the traction assembly of FIG. 10.
Figure 13:
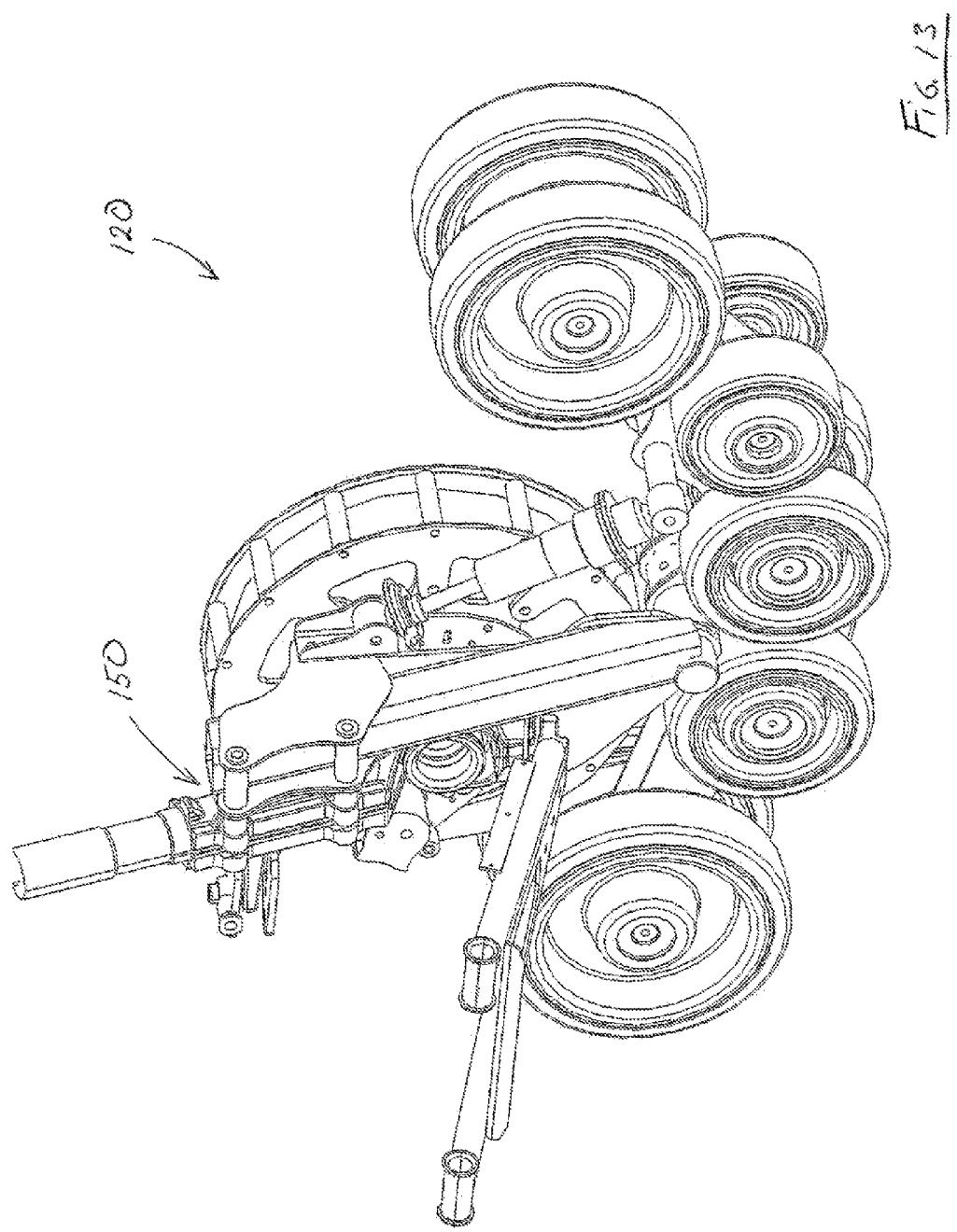
FIG. 13 is an interior perspective view of the traction assembly of FIG. 10.
Figure 14:
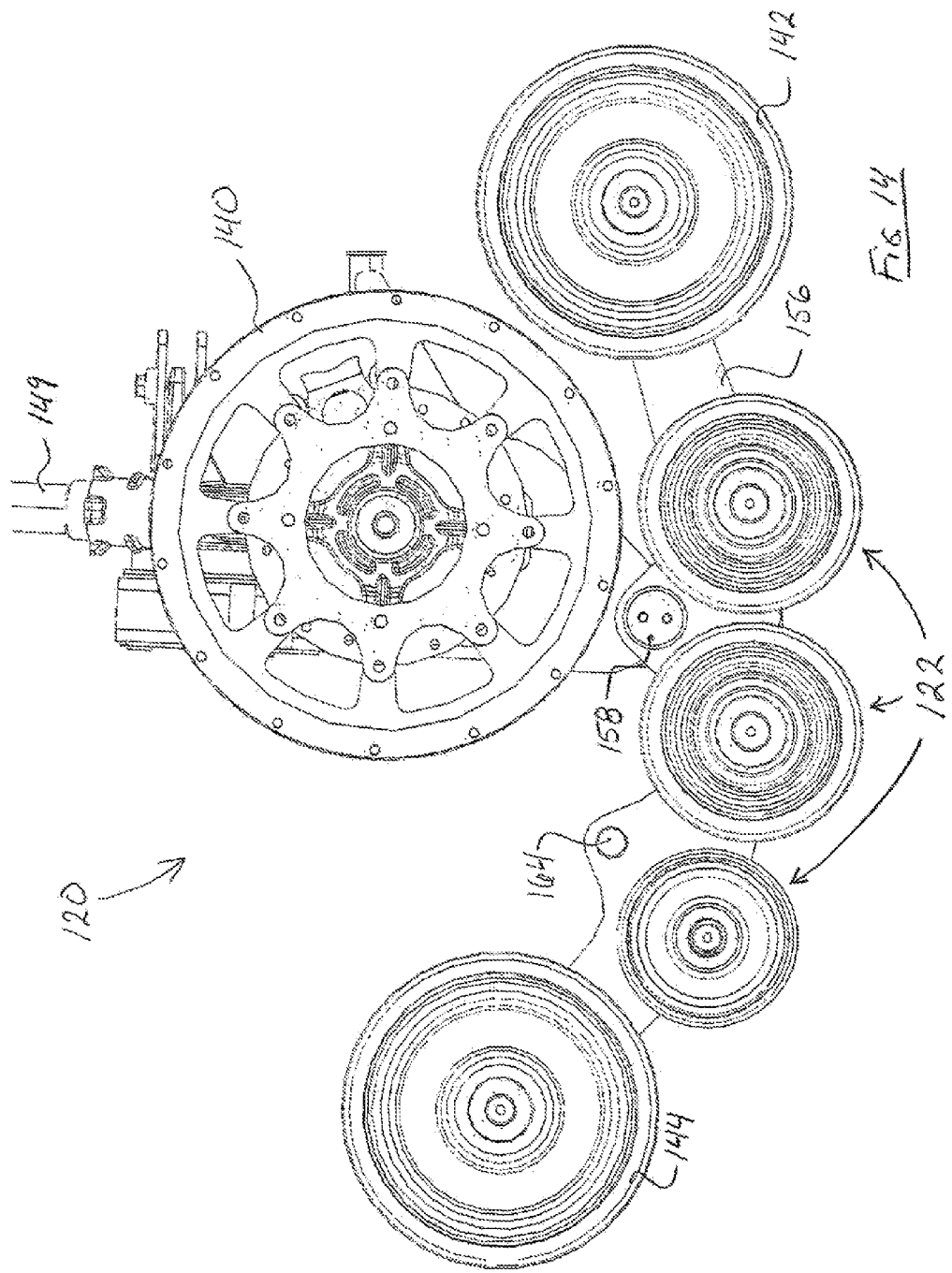
FIG. 14 is an exterior side view of a variant of the embodiment of FIG. 6 without the spring and the dampener.
Figure 15:
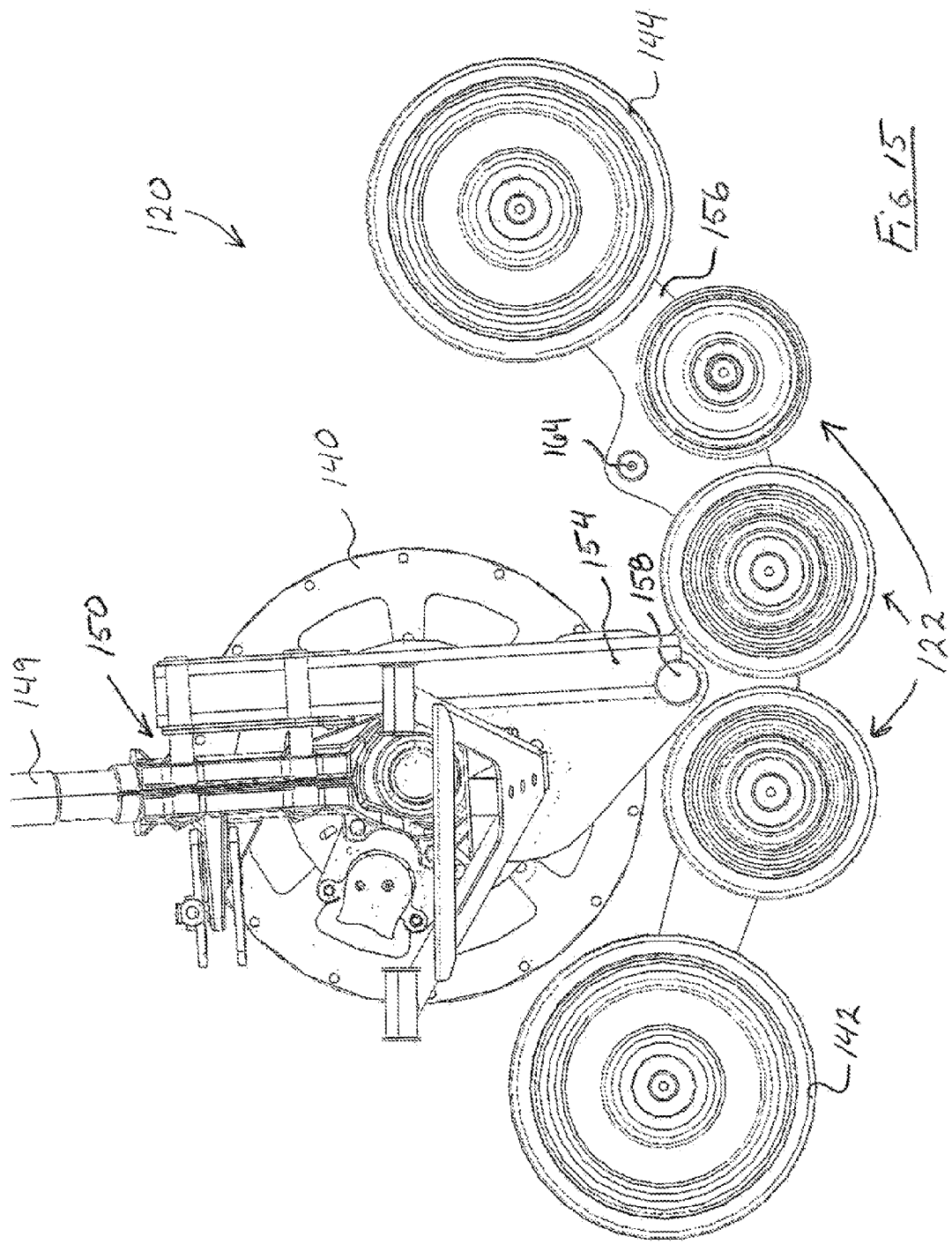
FIG. 15 is an interior side view of the traction assembly of FIG. 14.

As seen in FIG. 1, the vehicle 24 is an ATV for which the regular wheels (not shown) are replaced with such traction assemblies 20 and ski assemblies 26. Such traction assemblies 20 can also replace the front wheels of a vehicle as shown in FIG. 5. Other vehicles designed to ride on irregular, snowy, sandy, muddy or softer terrains can also incorporate the use of traction assembly 20. The traction assemblies 20 can be mounted on each side of the front and rear portion of the vehicle 24.

Figure 2:
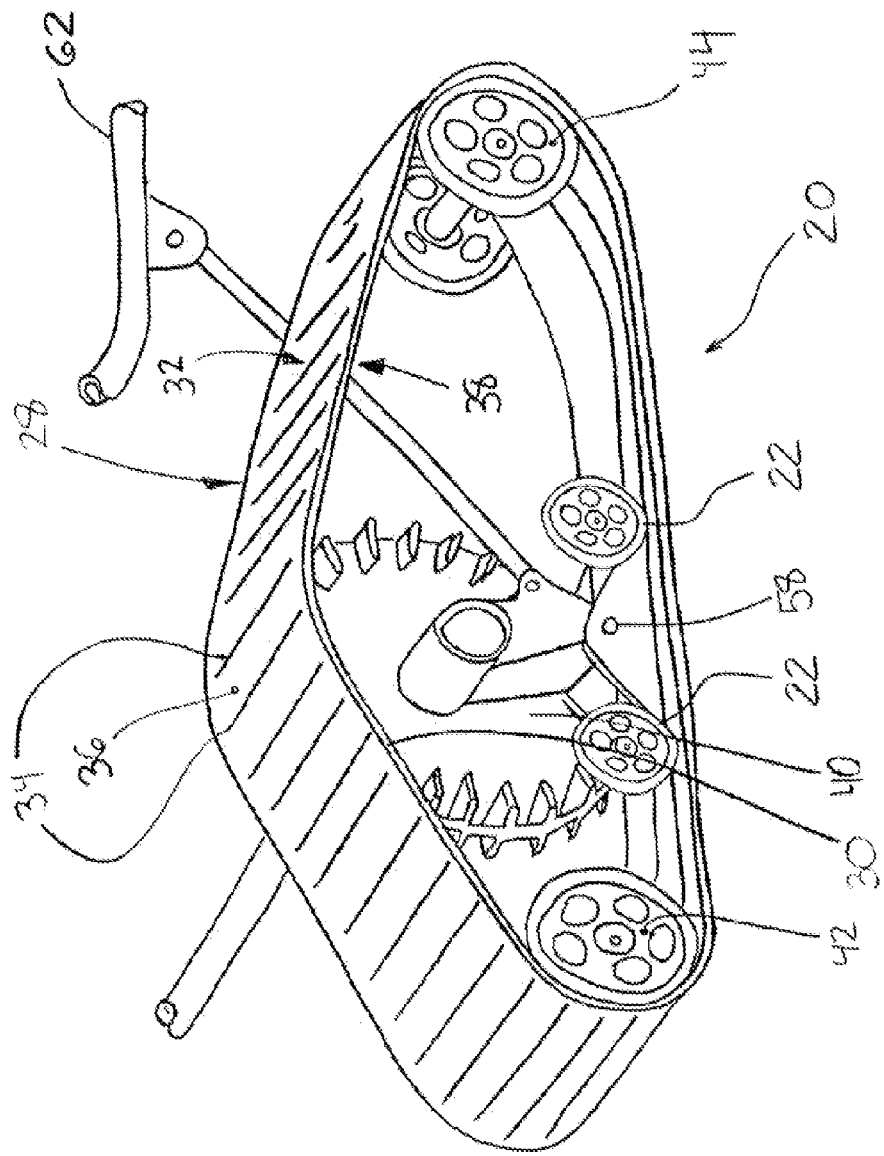
FIG. 2 is a partial isometric view of the vehicle showing the traction assembly of FIG. 1.

A first preferred embodiment of the traction assembly 20 is shown in more details in FIG. 2. The traction assembly 20 includes a traction band 28 which is preferably made of an endless elastomeric body 30, preferably reinforced by laterally extending stiffeners(not shown) that may or may not be completely embedded in the body 30. The body 30 of the band 28 has a ground-engaging outer side 32 comprising a selection of different lug profiles 34 separated from each other by a flat area 36. The inner side 38 usually has a plurality of guide lugs (not shown) which cooperate with a sprocket 40, idler wheels 42 and 44 and road wheels 22 to ensure power transmission from the vehicle 24 to the traction band 28 and stability.

Figure 3:
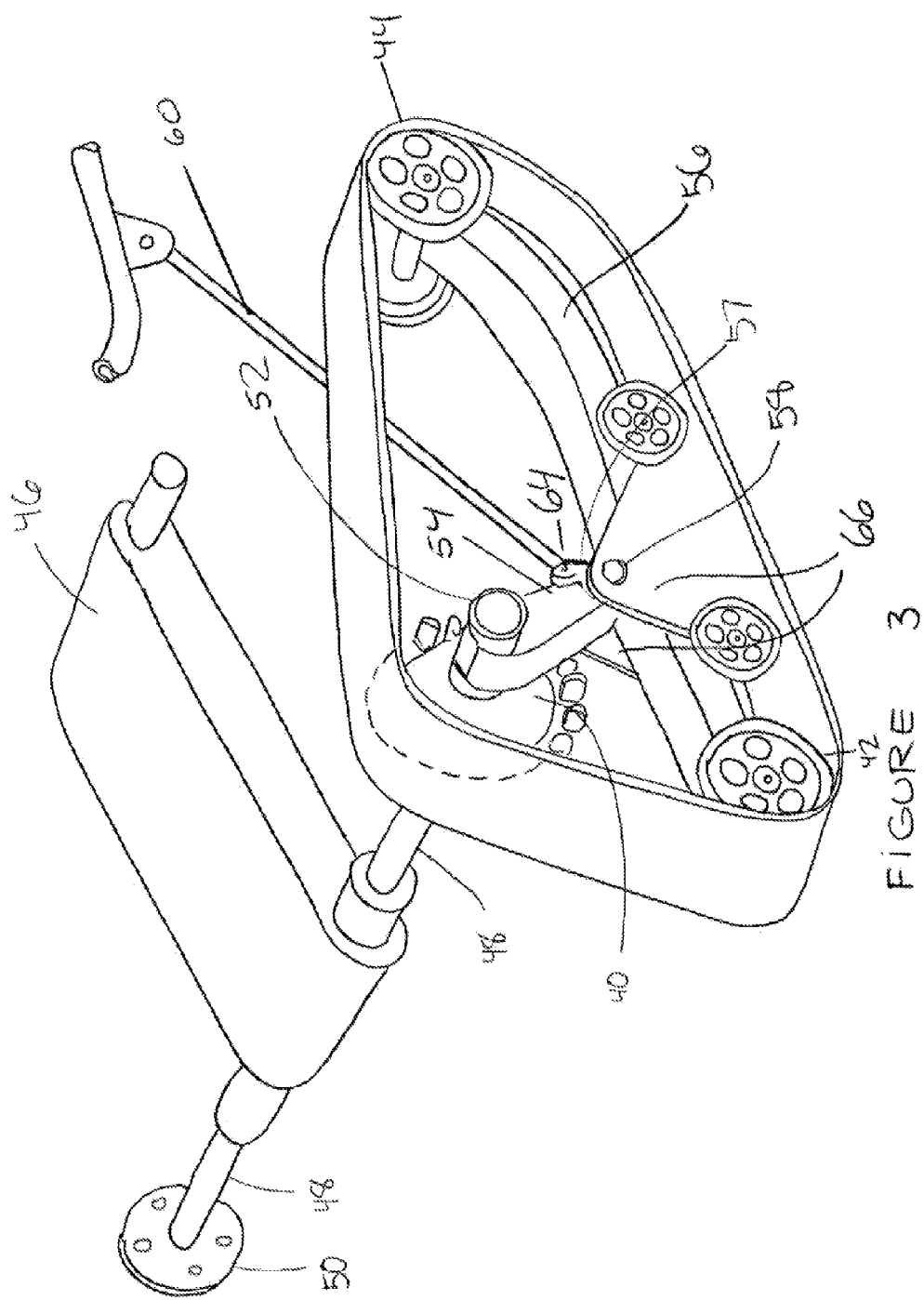
FIG. 3 is another partial isometric view of the vehicle showing the traction assembly of FIG. 1.

FIG. 3 shows in more details how the sprocket 40 and wheels 42 and 44 interact with each other and are installed to the structure 46 of the vehicle 24. On both sides of the structure 46 usually protrudes a shaft 48 which includes a hub 50 providing support for the wheel/tire assemblies (not shown) of the vehicle 24. In the present invention, the sprocket 40 is preferably fixedly attached by any known method directly to the hub 50 in place of wheel/tire assemblies (not shown).

A lateral support 52 extends from the sprocket 40 preferably along the center of rotation of the rotating components. The lateral support 52 pivotally holds a member 54 which radially connects the sprocket 40 to idler 42, 44 and road wheels 22 (not shown) via a support structure or slider 56. The member 54 is connected to the slider 56 via a pivot 58 and also includes a connection 57 where a link 60 connects the member 54 to the chassis 62 or structure 46 of the vehicle 24. The pivot 58 is located under the lateral support 52 and is preferably longitudinally displaced in relation with the lateral support 52 in order to change the caster angle.

The link 60 is preferably a rod-like bar with roller ball joints, bushings or rubber joints 64 providing tri-dimensional adjustability while keeping the same predetermined length during the operation of the vehicle 24. However, the link 60 may include lengthwise adjustability means to suit the dimensions of different types of vehicles 24.

The slider 56 and the member 54 are pivotally connected by the pivot 58 such that any significant relative motion between the two takes place as a rotation around the pivot 58. However, the rotation of the slider 56 around pivot 58 can be limited by rubber stoppers attached on the front and rear side of the member 54. These rubber stoppers help prevent the traction assembly 20 to make contact with the vehicle 24. Other contact preventing means could also be used without departing from the scope of the invention. The member 54 is mounted on the lateral support 52, preferably with rollers (not shown), such that it is not movably coupled to the rotating shaft 48 or sprocket 40 in operation.

Since the member 54 is free to rotate around the pivot 58, the predetermined length of the link 60 restrains the relative movement between the shaft 48 (and thus sprocket 40) (to which the link 60 is connected via the member 54 and the lateral support 52) and the slider 56 (to which the link 60 is connected via the member 54 and pivot point 58). Therefore, the interference risks between the sprocket 40 and the slider 56 are minimized.

The support structure or slider 56 consists of a structure which supports idler wheels 42 and 44 and a plurality of road wheels 22 and cooperates with the traction band 28. The slider 56 longitudinally or circumferentially extends in such a way as to give form to the traction band 28. The design of the slider 56 depends on the desired overall riding characteristics.

Figure 4:
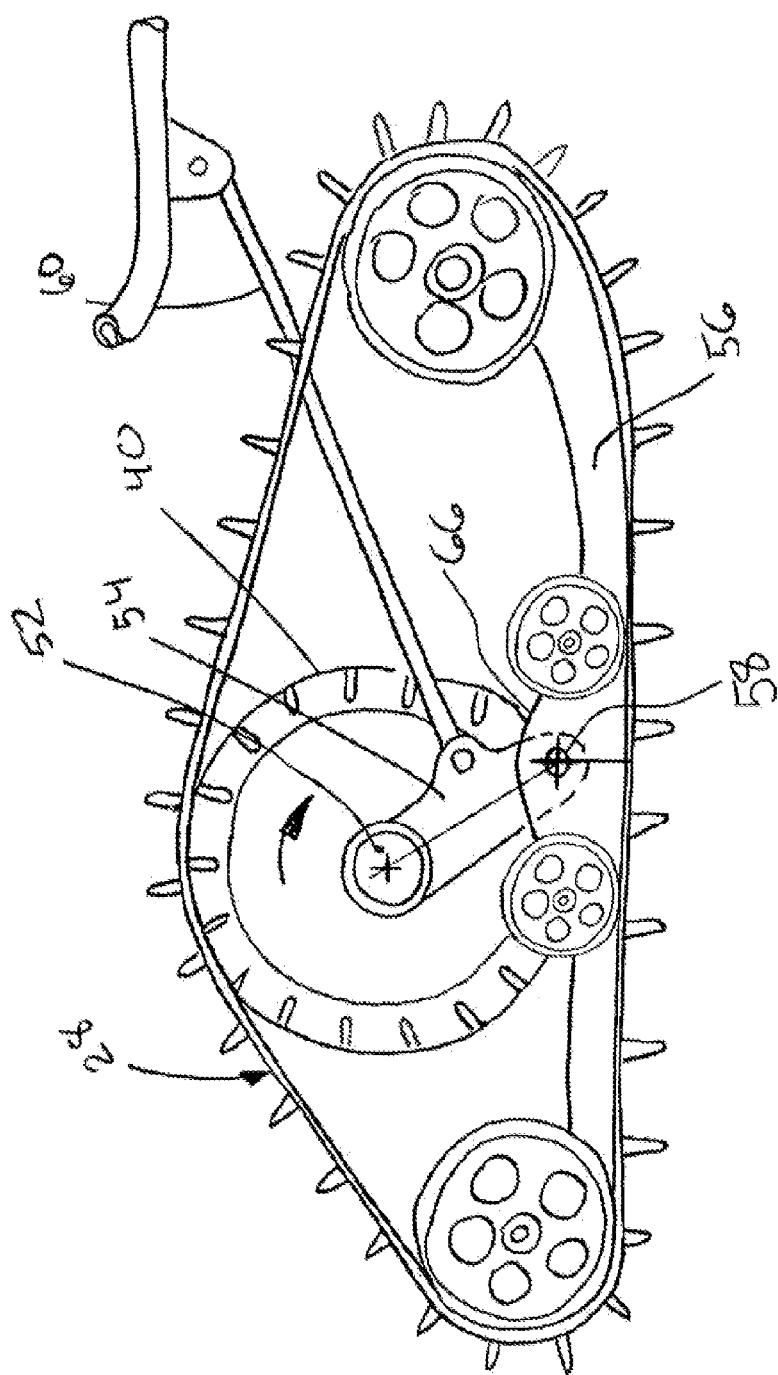
FIG. 4 is a partial schematic elevation view of the vehicle showing the traction assembly of FIG. 1.

In the variant shown in FIGS. 1 to 4, the slider 56 preferably includes at least one protuberances 66 extending in the vicinity of or toward the sprocket 40. The protuberance 66 is generally located under the support 52. The protuberance 66 supports the pivot 58 through mounting means (not shown). Also, as best depicted in FIG. 4, the protuberance 66 is preferably longitudinally located toward the front of the vehicle.

Depending on the number of idler wheels 42, 44 and road wheels 22 being supported by the slider 56, side wheel supports 68, 70 (shown in FIG. 1) which are fixedly connected to the slider 56 offer a pivotal connection to support the idler wheels 42, 44 and the road wheels 22.

Therefore, the traction assembly 20 comprises the traction band 28, the sprocket wheel 40, the laterally extending support 52, the member 54, the pivot 58, the protuberance 66, the link 60, the slider bar 56, preferably at least idler wheels 42 and 44 and preferably a plurality of road wheels 22. The interaction between those various components while the vehicle 24 is in operation are illustrated in more details in FIGS. 1 and 4.

A second preferred embodiment is shown in FIGS. 6-9 (and also 10-13 and 14-17). In this embodiment, the traction assembly 120 similarly comprises a support structure or slider bar 156 which supports idlers wheels 142 and 144 pivotally mounted at both extremities and a plurality of road wheels 122 pivotally mounted in-between. The support structure 156 further comprises a pivot point 158, located under the axis of the sprocket wheel 140. Pivot point 158 is preferably longitudinally displaced in relation to the axis of the sprocket wheel 140 in order to change the caster angle.

The sprocket wheel 140 is fixedly attached to the axle (not shown) or the wheel hub (not shown) of the vehicle 24.

In this second embodiment, the support structure 156 is not connected to the axle (not shown) or an extension thereof. Support structure 156 is interconnected to the suspension leg 149 which is generally connected to the axle in a known manner, with the help of member 154. The first end of member 154 is fixedly attached to the lower portion of the suspension leg 149 using a bracket assembly 150. The second end of member 154 is pivotally mounted to the support structure 156 via pivot point 158. The particular configuration of bracket assembly 150 depends on the particular configuration of the suspension leg lower portion. Therefore, different bracket assembly 150 should be necessary according to the design and shape of the suspension leg 149 used on different vehicles.

The skilled addressee will readily understand that the support structure 156 is not directly connected to the sprocket wheel 140 as in the prior art. Thus, support structure 156 can only pivot around pivot point 158. If the vehicle 24 equipped with traction assemblies 120 is ridden over uneven terrain, the amplitude of the movements of the traction assemblies 120 will be smaller, thus improving the riding quality if the vehicle.

To further improve the riding quality of vehicle 24 equipped with traction assemblies 120, the traction assembly 120 can further comprise a second pivot point 164, located on support structure 156 and longitudinally displaced in relation to the first pivot point 158. In the embodiment shown in FIGS. 7-18, the second pivot point 164 is preferably located in front of the first pivot point 158. However, the second pivot point could be located behind the first pivot point. A third pivot point 165 is located on the upper portion of the member 154. A shock absorber comprising a dampener 160 and a spring 162 is pivotally mounted between pivot points 164 and 165. The skilled addressee will note that even if this second preferred embodiment preferably comprises a shock absorber comprising a dampener 160 and a spring 162, the second embodiment would nevertheless work without the spring 162 and even without the spring 162 and the dampener 160 as shown is FIGS. 14 to 17.

When the vehicle is ridden and the traction assemblies 120 face a bump, the front portion of the traction assembly 120 facing the bump will rise, by pivoting around pivot point 158, in order to follow curvature of the terrain. However, if the bump is abrupt, the rising movement of the traction assembly 120 can be sharp and thus uncomfortable for the rider. The presence of the shock absorber 160 prevents sharp movements by partially absorbing and dampening the movement.

The same principles apply when the front portion of the traction assembly 120 faces a depression. The shock absorber 160 will prevent any sharp descending movements.

To improve the adjustability of the traction assembly 120, the support structure 156 could comprise a plurality of pivot points 158 longitudinally displaced in relation to each other.

Also, with the use of an adjustable shock absorber 160, it would be possible to artificially rise or lower the front portion of the traction assembly 120 should it be needed.

Obviously, the skilled addressee will understand that a traction band (not shown), known in the art, is tensioned around the sprocket wheel 140, the idlers wheels 142 and 144, the road wheels 122.

Although preferred embodiments of the invention have been described in detail herein and illustrated in the accompanying figures, it is to be understood that the invention is not limited to these precise embodiments and that various changes and modifications may be effected therein without departing from the scope or spirit of the present invention.

The invention claimed is:

1. A traction assembly for use on a vehicle having a frame and at least one traction axle, said assembly comprising a sprocket wheel adapted to be coupled to said axle, a longitudinally extending support structure and a traction band tensioned around and cooperating with said sprocket wheel and said support structure, said traction assembly further comprising:
   a. a support element extending laterally from said sprocket wheel;
   b. a member having a first end pivotally and non-drivingly connected to said support element, and a second end pivotally connected to said support structure at a first pivot point;
   c. a link having a third end pivotally connected to said member, and a fourth end pivotally connected to said frame;
   wherein said first pivot point is located under the rotation axis of said sprocket wheel whereby said support structure can pivot around said first pivot point.

2. A traction assembly according to claim 1, further comprising at least one idler wheel, pivotally mounted on said support structure, and a least one road wheel pivotally mounted on said support structure, wherein said traction band is tensioned around and cooperating with said sprocket wheel, said at least one idler wheel, said at least one road wheel and said support structure.

3. A traction assembly according to claim 1, in which said first pivot point is longitudinally displaced with respect to said rotation axis of said sprocket wheel.

4. A traction assembly according to claim 3, in which said first pivot point is longitudinally displaced toward the front of said vehicle.

5. A traction assembly according to claim 1, wherein said laterally extending support is located substantially at the center of said sprocket wheel.

6. A traction assembly according to claim 1, wherein said link is rigid.

7. A traction assembly according to claim 1, wherein said support structure comprises a protuberance extending upwardly and onto which said first pivot point is located.

8. A traction assembly according to claims 1, wherein said sprocket wheel is coupled to said traction axle.

9. A traction assembly according to claim 1, wherein said vehicle comprises two front wheels and two rear wheels.

10. A traction assembly according to claim 9, which can replace one of said front wheels of said vehicle.

11. A traction assembly according to claim 9, which can replace one of said rear wheels of said vehicle.

12. A traction assembly according to claim 9, which can replace one of said front wheels and said rear wheels of said vehicle.

* * * * *